United States Patent
Wang et al.

(10) Patent No.: US 12,316,202 B2
(45) Date of Patent: May 27, 2025

(54) COOLING SYSTEM, ELECTRIC MOTOR AND WIND-POWER ELECTRIC GENERATOR SET

(71) Applicant: XINJIANG GOLDWIND SCIENCE & TECHNOLOGY CO., LTD., Xinjiang (CN)

(72) Inventors: Dinghui Wang, Beijing (CN); Jinmeng Li, Beijing (CN); Jing Xia, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 881 days.

(21) Appl. No.: 17/594,810

(22) PCT Filed: Mar. 9, 2020

(86) PCT No.: PCT/CN2020/078408
§ 371 (c)(1),
(2) Date: Oct. 29, 2021

(87) PCT Pub. No.: WO2020/220834
PCT Pub. Date: Nov. 5, 2020

(65) Prior Publication Data
US 2022/0239195 A1    Jul. 28, 2022

(30) Foreign Application Priority Data

Apr. 30, 2019   (CN) .......................... 201910364164.5

(51) Int. Cl.
*H02K 9/08*        (2006.01)
*H02J 3/38*        (2006.01)
(Continued)

(52) U.S. Cl.
CPC .............. *H02K 9/08* (2013.01); *H02J 3/381* (2013.01); *H02K 5/207* (2021.01); *H02K 7/1838* (2013.01); *H02K 9/06* (2013.01); *H02J 2300/28* (2020.01)

(58) Field of Classification Search
CPC .............................. H02K 7/1838; H02K 9/06
(Continued)

(56) References Cited

U.S. PATENT DOCUMENTS

| 4,465,947 A | 8/1984 | Armor et al. |
| 2020/0116133 A1* | 4/2020 | Airoldi .................. F03D 80/60 |

FOREIGN PATENT DOCUMENTS

| CN | 201466890 U | 5/2010 |
| CN | 101728899 A | 6/2010 |
(Continued)

OTHER PUBLICATIONS

Machine translation of CN-109474113-A (Year: 2019).*
(Continued)

*Primary Examiner* — Oluseye Iwarere
*Assistant Examiner* — Minki Chang

(57) ABSTRACT

The present disclosure relates to a cooling system, an electric motor and a wind-power electric generator set. The cooling system is applied to an electric motor; the electric motor includes a stator support and a rotor support, the stator support is dynamically sealingly connected to the rotor support to form ventilation chambers respectively arranged at two ends of the electric motor in an axial direction, first ventilation holes are formed at two ends of the stator support in the axial direction respectively, and the cooling system includes: a flow-confluence chamber, arranged in a circumferential direction of the stator support; an accommodating chamber, arranged in the circumferential direction of the stator support; a heat exchanger, arranged in the accommo-
(Continued)

dating chamber or in the flow-confluence chamber; a circulating fan, arranged in the circumferential direction of the stator support and located at a side of the stator support in the axial direction.

20 Claims, 6 Drawing Sheets

(51) Int. Cl.
  *H02K 5/20* (2006.01)
  *H02K 7/18* (2006.01)
  *H02K 9/06* (2006.01)
(58) Field of Classification Search
  USPC .............................................. 310/55, 62, 63
  See application file for complete search history.

(56) References Cited

FOREIGN PATENT DOCUMENTS

| CN | 101841213 A | 9/2010 | | |
|----|----|----|----|----|
| CN | 201708651 U | 1/2011 | | |
| CN | 102142738 A | 8/2011 | | |
| CN | 201966730 U | 9/2011 | | |
| CN | 102246395 A | 11/2011 | | |
| CN | 102412662 B | 7/2013 | | |
| CN | 101728899 B | 9/2013 | | |
| CN | 204615572 U | 9/2015 | | |
| CN | 105240222 A | 1/2016 | | |
| CN | 105322674 A | 2/2016 | | |
| CN | 103490558 B | 7/2016 | | |
| CN | 108768072 A | 11/2018 | | |
| CN | 109474113 A | * 3/2019 | ............ | F03D 9/255 |
| DE | 102012202473 A1 | 8/2013 | | |
| DE | 102013100453 A1 | 6/2014 | | |
| EP | 1837519 A2 | 9/2007 | | |
| EP | 2234246 A1 | 9/2010 | | |
| EP | 2251544 A2 | 11/2010 | | |
| EP | 2354542 B1 | 7/2013 | | |
| EP | 3054565 A1 | 8/2016 | | |
| WO | 2018/141514 A1 | 8/2018 | | |

OTHER PUBLICATIONS

EPO Communication Pursuant to Article 94(3) dated Feb. 20, 2023; Appln. No. 20798534.2.

First Chinese Office Action dated Oct. 23, 2023; Appln. No. 201910364164.5 (Concise Explanation of Relevance for CN-OA1 in English included).

The International Search Report mailed Jun. 11, 2020; PCT/CN2020/078408.

The Extended European Search Report dated Apr. 28, 2022; Appln. No. 20798534.2.

The First Indian Office Action dated Mar. 15, 2022; Appln. No. 202117049720.

Australian Examination Report No. 1 dated Aug. 30, 2022; Appln. No. 2020265920.

* cited by examiner

COOLING SYSTEM, ELECTRIC MOTOR AND WIND-POWER ELECTRIC GENERATOR SET

CROSS REFERENCE TO RELATED APPLICATION

This application is a National Stage of International Application No. PCT/CN2020/078408, filed on Mar. 9, 2020, which claims the benefit of and priority to Chinese Patent Application No. 201910364164.5, filed on Apr. 30, 2019, both of which are hereby incorporated by reference in their entireties.

TECHNICAL FIELD

The present disclosure relates to a technical filed of cooling, and particularly relates to a cooling system, an electric motor and a wind-power electric generator set.

BACKGROUND

Wind power is one of the renewable energy technologies closest to commercialization, and is the focus of renewable energy development. A electric motor in a wind-power electric generator set has the heat loss during operation, in which the heat loss mainly includes: the electromagnetic loss, that is, the Joule heat generated by the ohmic impedance in a winding set, that is, the copper loss; the hysteresis loss, the eddy current loss and the like in an iron core, that is, the iron loss; and the inevitable stray loss; if the electric motor is a permanent magnet electric motor, it further includes the magnetic steel loss. Because of these losses cause, the electric motor releases a large amount of heat when is working, and the heat will not only cause a certain impact on the electric motor itself and a insulation structure of the electric motor, which can lead to the shortened insulation life and even insulation failure, but also cause the output power of the electric motor to continue to be reduced.

With the rapid development of an offshore wind-power electric generator set, a unit generator capacity of the set continues to increase, which directly leads to the losses of the wind-power electric generator set continuously increasing, and a cooling system of the electric motor will occupy more space in a nacelle. For working conditions with heavy sandstorms or harsh working environments, especially for marine salt fog environments, an air-to-air cooling system is likely to cause dust accumulation in the electric generator and the cooling air volume of the system decreasing, resulting in the insufficient heat dissipation, and at the same time, it is more likely to cause damage and failure to components and members, and reduce the life of the whole machine; adopting a water-cooling system, in order to ensure the temperature limitation of the winding set, the temperature rise requirements and the temperature uniformity, it is bound to produce too many loops and joints in the electric motor; at the same time, a compact flow channel increases the resistance of the system and increases the self-consumption; considering the cooling of the ends and the rotor of the winding set, an air cooling system needs to be configured independently, resulting in a complicated structure of the cooling system and the reduced reliability.

SUMMARY

The object of the present disclosure is to provide a cooling system, an electric motor and a wind-power electric generator set, and an overall structure of the cooling system is simple and compact, and occupies smaller space.

In one aspect, a cooling system applied to an electric motor is provided by the present disclosure; the electric motor includes a stator support and a rotor support, the stator support is dynamically sealingly connected to the rotor support to form ventilation chambers respectively arranged at two ends of the electric motor in an axial direction, first ventilation holes are formed at two ends of the stator support in the axial direction respectively, and the cooling system includes a flow-confluence chamber, arranged in a circumferential direction of the stator support; an accommodating chamber, arranged in the circumferential direction of the stator support; in which the accommodating chamber is located at an inner side of the flow-confluence chamber in a radial direction and communicates with the flow-confluence chamber, and the first ventilation holes are located outside the accommodating chamber; a heat exchanger, arranged in the accommodating chamber or the flow-confluence chamber; a circulating fan, arranged in the circumferential direction of the stator support and located at a side of the stator support in the axial direction, wherein the circulating fan has an air inlet and an air outlet; herein, after cooling air flows out of the air outlet of the circulating fan, a part of the cooling air enters one end of the ventilation chamber which is closer; the other part of the cooling air enters the other end of the ventilation chamber through the first ventilation holes, which are respectively formed at the two ends of the stator support in the axial direction, the two parts of the cooling air flow over a heat-generating member in the electric motor, and then enters the air inlet of the circulating fan via the flow-confluence chamber, the heat exchanger and the accommodating chamber.

In another aspect, an electric motor is provided by the present disclosure, including any one of the cooling systems as described above.

In another aspect, a wind-power electric generator set is provided by the present disclosure, including a nacelle, and the electric motor as described above, in which the circulating fan of the cooling system of the electric motor is arranged at a side of the nacelle.

In the cooling system and the electric motor provided by the present disclosure, by arranging the flow-confluence chamber in the circumferential direction of the stator support; arranging the accommodating chamber in the circumferential direction of the stator support, arranging the heat exchanger in the accommodating chamber or the flow-confluence chamber, arranging the circulating fan at the stator support in the axial direction, and forming the first ventilation holes located at an outer side of the accommodating chamber at two ends of the stator support in the axial direction respectively, it can be achieved that the heat-generating member inside the electric motor can be cooled cyclically, and the overall structure of the cooling system can be simple and compact and can occupy smaller space. In addition, by adopting the electric motor, the wind-power electric generator set provided by the present disclosure can effectively reduce the size of the nacelle, thereby reducing the overall machine cost and the overall machine load, and improving the reliability and maintainability of the wind-power electric generator set.

BRIEF DESCRIPTION OF THE DRAWINGS

The present disclosure can be better understood from the following description of the specific embodiments of the present disclosure in conjunction with the drawings; herein, by reading the following detailed description of the non-limiting embodiments with reference to the drawings, other features, objects, and advantages of the present disclosure will become more apparent, and the same or similar reference signs indicate the same or similar features.

In the drawings.

Figure 1:
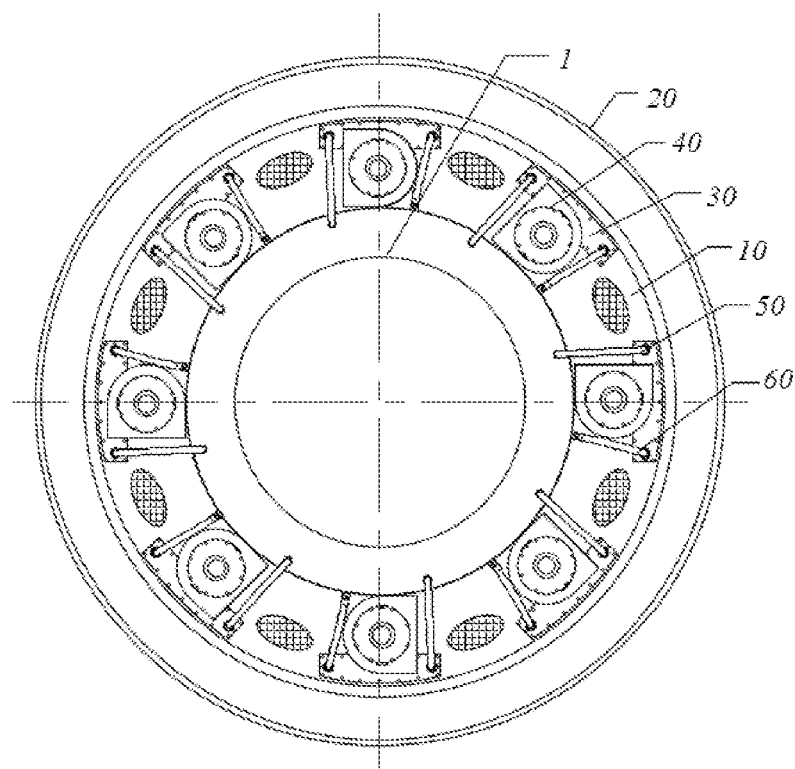
FIG. 1 shows a schematic view of an overall layout structure of an electric motor according to the embodiments of the present disclosure.

1—main shaft; 1a—stator winding set; 1b—stator iron core; 1c—air gap; 1d—radial ventilation channel; 10—stator support; 101—accommodating chamber; 102—flow-confluence chamber; 103—isolation chamber; 11—first separating plate; 111—inspection opening; 12—second separating plate; 13—ring-shaped plate; 14—fixing support; 141—first plate; 142—second plate; 143—third plate; 144—mounting groove; 15—cover plate; 151—first opening; 152—second opening; 16—filter member; 17—first end plate; 18—second end plate; a—first ventilation hole; b—second ventilation hole;

20—rotor support; 2a—magnetic steel; 21—ventilation chamber;

30—heat exchanger; 31—first joint; 32—second joint; 40—circulating fan; 401—housing;

402—fan; 403—motor; 41—air inlet; 42—air outlet; 43—air supplying pipe; 50—liquid supplying pipe; 60—liquid returning pipe/air returning pipe; 100—electric motor; 300—nacelle.

DETAILED DESCRIPTION

The features and exemplary embodiments of various aspects of the present disclosure will be described in detail below. Many specific details are disclosed in the following detailed description in order to fully understand the present disclosure. However, it is obvious to those skilled in the art that the present disclosure can be implemented without some of these specific details. The following description of the embodiments is merely to provide a better understanding of the present disclosure by showing examples of the present disclosure. The present disclosure is by no means limited to any specific configurations and algorithms proposed below, but covers any modification, replacement and improvement of elements, member and algorithms without departing from the spirit of the present disclosure. In the drawings and the following description, well-known structures and technologies are not shown in order to avoid unnecessary obscurity of the present disclosure.

In order to better understand the present disclosure, a cooling system, an electric motor and a wind-power electric generator set in the embodiments of the present disclosure will be described in detail below in conjunction with FIG. 1 to FIG. 7.

Figure 2:
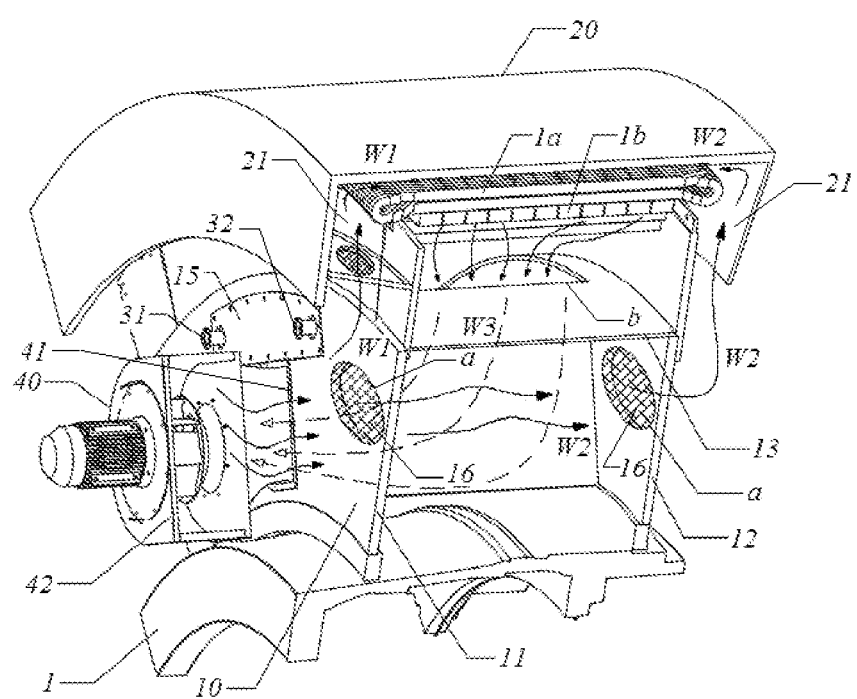
FIG. 2 shows a partial structural schematic view of a cooling system of an electric motor according to the embodiments of the present disclosure.

Referring to FIG. 1 and FIG. 2 together, the electric motor 100 provided by the embodiments of the present disclosure, includes the cooling system; the cooling system has a compact structure and occupies smaller space.

The electric motor may have a structure of an outer rotor and an inner stator, or a structure of an outer stator and an inner rotor. The stator is fixed on a fixing shaft by a stator support 10, the rotor is fixed on a moving shaft by a rotor support 20, and the fixing shaft and the moving shaft are connected by a bearing and realize the relative rotation. The fixing shaft and the moving shaft together form a main shaft 1 of the electric motor. In order to ease of description, the embodiment of the present disclosure takes the electric motor with the structure of the outer rotor and the inner stator as an example for description.

The stator includes a stator winding set 1a and a plurality of stator iron cores 1b arranged to be spaced apart from one another in an axial direction; each of radial ventilation channels 1d is formed between each two adjacent stator iron cores 1b. Each of stator iron cores 1b includes a yoke portion and a tooth portion (not shown in the drawings) integrally formed with the yoke portion. The stator winding set 1a is wound around the tooth portion, and the stator is fixed to the stator support 10 through the yoke portion. A magnetic steel 2a is arranged on the rotor support 20, and an air gap 1c is formed between the rotor and the stator in a radial direction. The stator winding set 1a, the stator iron cores 1b and the magnetic steel 2a are all heat-generating members, and the cooling system is used to cool the heat-generating members.

Figure 4:
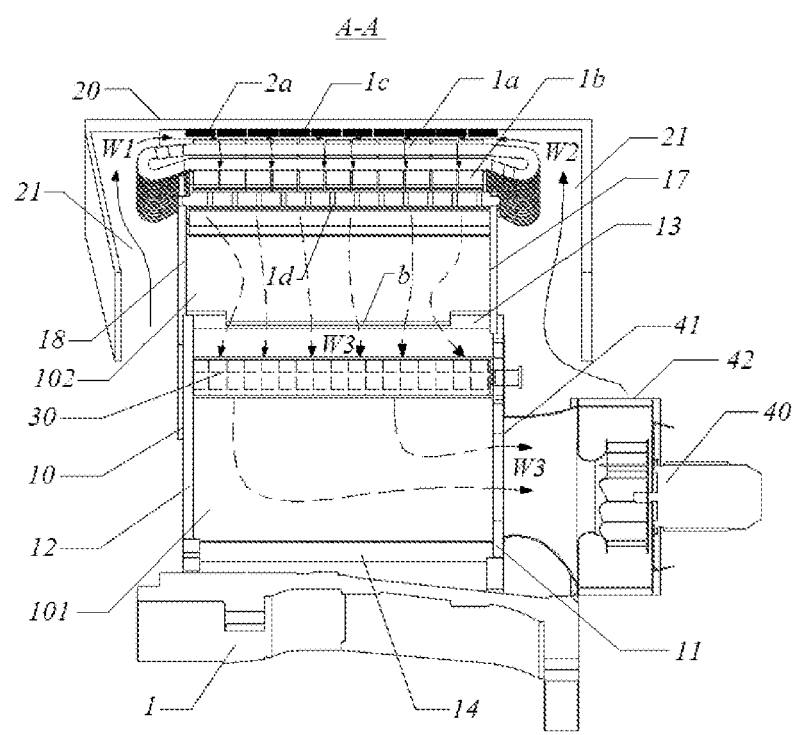
FIG. 4 shows a cross-sectional view of the cooling system of the electric motor shown in the direction A-A in FIG. 3.

Referring to FIG. 2 and FIG. 4 together, the cooling system applied to the electric motor as described above is provided by the embodiments of the present disclosure; the electric motor includes the stator support 10 and the rotor support 20, the stator support 10 is dynamically sealingly connected to the rotor support 20 to form ventilation chambers 21 respectively arranged at two ends of the electric motor in the axial direction, and first ventilation holes a are respectively formed at two ends of the stator support in the axial direction.

The cooling system includes a flow-confluence chamber 102, an accommodating chamber 101, a heat exchanger 30 and a circulating fan 40.

The flow-confluence chamber 102 is arranged in a circumferential direction of the stator support 10.

The accommodating chamber 101 is arranged in the circumferential direction of the stator support 10; the accommodating chamber 101 is located at an inner side of the flow-confluence chamber 102 in the radial direction and communicates with the flow-confluence chamber 102; and the first ventilation holes a are located outside the accommodating chamber 101.

The heat exchanger 30 is arranged in the accommodating chamber 101 or in the flow-confluence chamber 102. The heat exchanger 30 may be an air-to-air heat exchanger or an air-to-liquid heat exchanger. Optionally, the heat exchanger 30 is, such as, but not limited to, a plate-fin type heat exchanger, a pipe-fin type heat exchanger or an array pipe air-liquid type heat exchanger. A cooling medium in the heat exchanger 30 may be a liquid medium or a phase-changing medium. The cooling medium in the heat exchanger 30 exchanges heat with an external cooling system through a liquid supplying pipe 50 and a liquid returning/air returning pipe 60 located at an outer side of the stator support 10, thereby circularly cooling the electric motor.

The circulating fan 40 is arranged in the circumferential direction of the stator support 10 and located at a side of the stator support 10 in the axial direction, and the circulating fan has an air inlet 41 and an air outlet 42. Herein, after cooling air flows out of the air outlet 42 of the circulating fan 40, a part of the cooling air enters one end of the ventilation chamber 21 which is closer; the other part of the cooling air enters the other end of the ventilation chamber 21 through the first ventilation holes a, which are respectively formed at the two ends of the stator support 10 in the axial direction, the two parts of the cooling air flow over a heat-generating member in the electric motor, and enters the air inlet 41 of the circulating fan 40 via the flow-confluence chamber 102, the heat exchanger 30 and the accommodating chamber 101.

Therefore, taking the heat exchanger 30 arranged in the accommodating chamber 101 as an example, a cooling process of the cooling system provided by the embodiments of the present disclosure is as follows: the cooling air enters the circulating fan 40 from the heat exchanger 30 through the air inlet 41, and directly enters an external environment under a negative pressure of the circulating fan 40, so that it can ensure the uniformity of an inlet airflow. Herein, a part of the cooling air passes through the air outlet 42 and directly enters the ventilation chamber 21 at the near end; as shown by a solid arrow W1 in FIG. 3, the part of cooling air cools an end of the stator winding set 1a, and then flows along the air gap 1c, so that it can be achieved that a part of the magnetic steel 2a, the rotor yoke and the stator winding set 1a is cooled; the other part of the cooling air enters the ventilation chamber 21 at the other end of the electric motor through the first ventilation holes a at the two ends of the stator support 10 in the axial direction; as shown by a solid arrow W2 in FIG. 3, the other part of the cooling air cools the other end of the stator winding set 1a, and then flows along the air gap 1c to cool the other part of the magnetic steel 2a, the rotor yoke and the stator winding set 1a.

Figure 3:
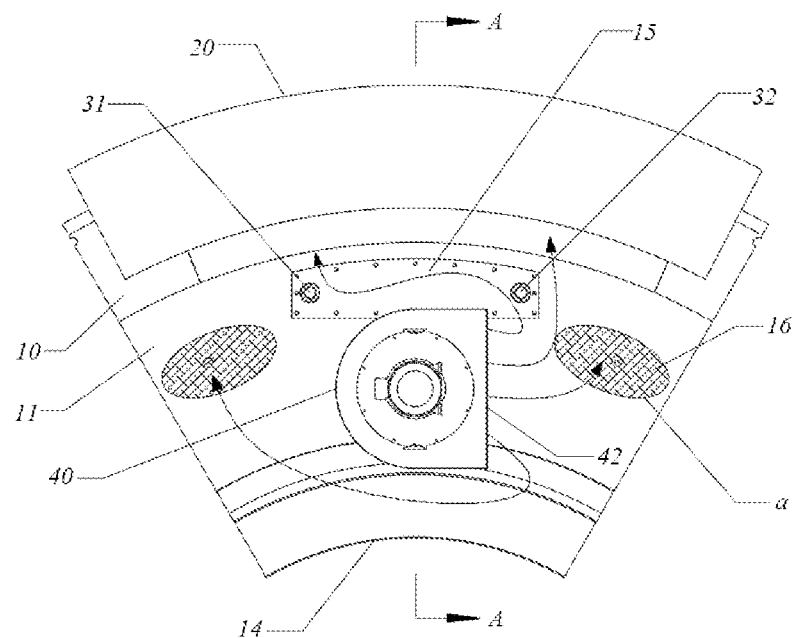
FIG. 3 shows a partial structural schematic view of the cooling system of the electric motor shown in FIG. 2 in an axial direction.

As shown by a dotted arrow W3 in FIG. 3, two parts of the cooling air entering the air gap 1c can cool the stator winding set 1a and a stator yoke through a plurality of radial ventilation channels 1d distributed to be spaced apart from one another in the axial direction of the stator; a temperature of the cooling air passing through the radial ventilation channels 1d is increased, and the cooling air with the high-temperature enters the accommodating chamber 101 via the flow-confluence chamber 102 and a second ventilation hole b under the action of the circulating fan 40, so that the two parts of the cooling air entering the air gap 1c can exchange heat with the heat exchanger 30. The flow-confluence chamber 102 and the accommodating chamber 101 forms an effective airflow organization sealing chamber in the electric motor to establish a reasonable airflow organization and to realize the effective heat dissipation of the stator winding set 1a, the stator iron cores 1b and the magnetic steel 2a. The heat exchanger 30 is connected to an external cooling system through the liquid supplying pipe 50 and the liquid returning pipe/air returning pipe 60, so that the temperature of the cooling air is decreased to form an airflow with a relatively low temperature, and then the cooling air enters the external environment again under the action of the circulating fan 40 to perform the next cooling cycle of the airflow organization.

Since the circulating fan 40 is arranged in the axial direction of the electric motor, the air outlet 42 is arranged toward one of the ventilation chambers 21 at an end of the shaft of the electric motor to guide the airflow from the heat exchanger 30 to the ventilation chamber 21; and the airflow from the heat exchanger 30 is guided into another ventilation chamber 21 through the first ventilation holes a formed at the two ends of the stator support 10 in the axial. By means of an organic combination of the heat exchanger 30, the circulating fan 40 and the stator support 10, only one air outlet 42 needs to be formed on the circulating fan 40, so that the volume of the circulating fan 40 can be reduced.

In addition, the liquid supplying pipe 50 and the liquid returning pipe/gas returning pipe 60 of the heat exchanger 30 are located at an outside of the accommodating chamber 101, so that it can further simplify an internal structure of the electric motor, and can make an overall structure of the motor simpler, more compact, and occupy smaller space.

In the cooling system provided by the embodiments of the present disclosure, the flow-confluence chamber 102 and the accommodating chamber 101 communicating with the flow-confluence chamber 102 are formed in the circumferential direction of the stator support 10, and the heat exchanger 30 is arranged in the flow-confluence chamber 102 or the accommodating chamber 101, the circulating fan 40 is arranged in the axial direction of the stator support 10, and the first ventilation holes a, which are located at an outer side of the accommodating chamber 101, are respectively formed at two ends of the stator support in the axial direction, so that it can be achieved that the heat-generating members inside the electric motor can be cooled cyclically, and the overall structure of the cooling system can be simple and compact and can occupy smaller space.

The specific structure of the cooling system will be described in further detail below in conjunction with the drawings.

Further referring to FIG. 1, in some embodiments, two or more circulating fans 40 are distributed to be spaced apart from one another in the circumferential direction of the stator support 10, thus, compared to an integral circulating fan arranged in the axial direction of the stator support, the same heat dissipation effect can be achieved, and the overall structure of the electric motor can be simple and compact and can occupy smaller space at the same time.

Optionally, two or more accommodating chambers 101 are distributed to be spaced apart from one another in the circumferential direction of the stator support 10 and correspond to the two or more circulating fans 40 in a one-to-one correspondence, and the heat exchanger 30 is arranged in each of the accommodating chambers 101. Optionally, the two or more circulating fans 40 are evenly distributed in the circumferential direction of the stator support 10; correspondingly, the accommodating chambers 101 and the circulating fans 40 are also evenly distributed in the circumferential direction of the stator support 10.

Since the ventilation chambers 21 at the two ends of the electric motor in the axial direction have a large enough volume, they can serve as a static pressure chamber, so that the ends of the stator winding set 1a have a uniform cooling effect, while ensuring the uniformity of the airflow entering the air gap 1c in the axial direction; the cooling air entering the air gap 1c flows along the air gap 1c, and at the same time flows through the stator winding set 1a and the radial ventilation channels 1d of the stator iron cores 1b into the flow-confluence chamber 102; the flow-confluence chamber 102 also has a large enough volume to serve as the static pressure chamber, thereby ensuring the uniformity of the airflow in an entire circumferential space, avoiding the uneven airflow organization, and improving the uniformity of the heat dissipation of the cooling system.

Further referring to FIG. 4, the stator support 10 includes a ring-shaped plate 13 extending in the axial direction; the ring-shaped plate 13 divides the stator support 10 into the flow-confluence chamber 102 and the accommodating chamber 101 in the radial direction; the ring-shaped plate 13 is provided with at least one second ventilation hole b in the circumferential direction; and the flow-confluence chamber 102 communicates with the accommodating chamber 101 through the second ventilation hole b.

Further, the stator support 10 further includes a first end plate 17 and a second end plate 18 that extend in the radial direction and are arranged opposite to each other in the axial direction, and the flow-confluence chamber 102 extending through in the circumferential direction is formed by the first end plate 17, the second end plate 18 and the ring-shaped plate 13.

The stator support 10 further includes a first separating plate 11 and a second separating plate 12 that are located between the first end plate 17 and the second end plate 18, extend in the radial direction, and are arranged coaxially; the first separating plate 11 is located on an inner side of the first end plate 17 in the radial direction, the second separating plate 12 is located on an inner side of the second end plate 18 in the radial direction, and the accommodating chamber 101 is formed by the first separating plate, the second separating plate and the ring-shaped plate 13.

The first ventilation holes a are arranged on the first separating plate 11 and the second separating plate 12; optionally, the heat exchanger 30 is arranged in the accommodating chamber 101; optionally, the circulating fan 40 is arranged at an outer side of the first separating plate 11 in the axial direction.

Further, the circulating fan 40 includes a housing 401, and further includes a fan 402 and a motor 403 that are accommodated in the housing 401. The motor 403 drives the fan 402 to rotate. The air inlet 41 and the air outlet 42 are respectively arranged on the housing 401.

In addition, an air supplying pipe 43 extending toward the first separating plate 11 is arranged at the air inlet 41 of the circulating fan 40. Optionally, the air supplying pipe 43 is the pipe with a variable diameter, so as to buffer the vibration impact of a negative pressure cooling air flow generated by the circulating fan 40 on the accommodating chamber 101.

For a working condition with heavy wind and sand or harsh working environment, in order to avoid insufficient heat dissipation of the electric motor due to dust accumulation or damage and failure of a component, optionally, filter members are respectively arranged at the first ventilation holes a of the first separating plate 11 and the second separating plate 12.

Figure 5:
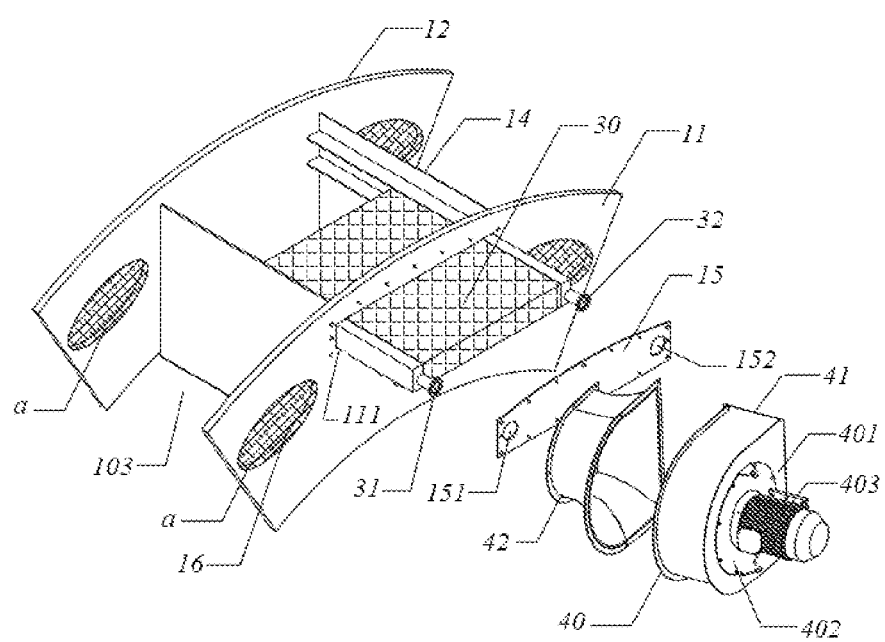
FIG. 5 shows a partial exploded structural schematic view of the cooling system shown in FIG. 2.
Figure 6:
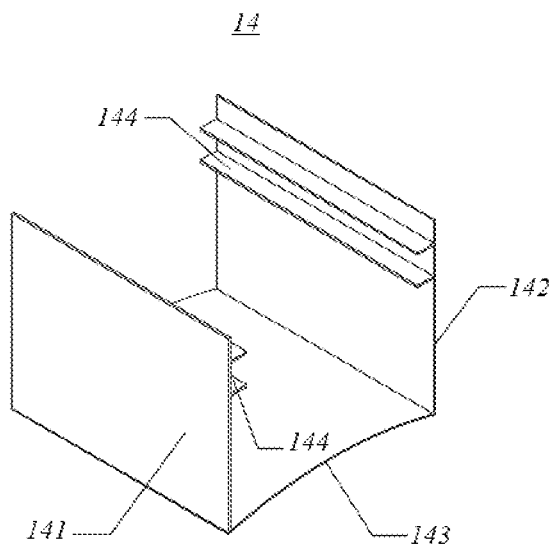
FIG. 6 shows a structural schematic view of a fixing support of the cooling system shown in FIG. 5.
Figure 7:
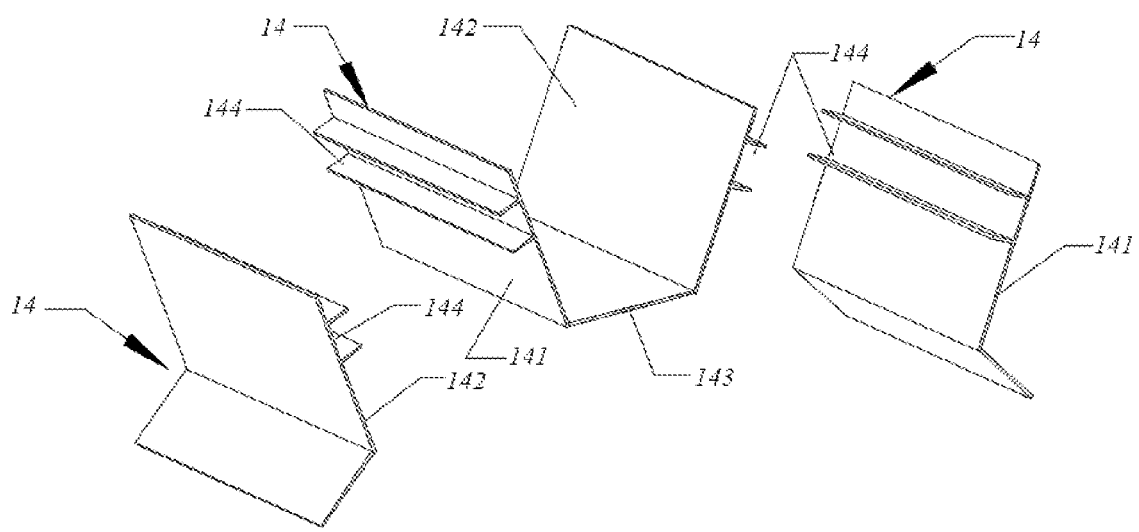
FIG. 7 shows a structural schematic view of another fixing support of the cooling system shown in FIG. 5.

Referring to FIG. 5 to FIG. 7 together, the cooling system further includes at least one fixing support 14 distributed to be spaced apart from one another in the circumferential direction of the stator support 10, the fixing support 14 is arranged between the first separating plate 11 and the second separating plate 12, and the heat exchanger 30 is detachably mounted on the fixing support 14.

The fixing support 14 includes a first plate 141 and a second plate 142 that extend in the radial direction and are arranged opposite to each other in the circumferential direction, and a third plate 143 connecting the first plate 141 and the second plate 142 and extending in the circumferential direction of the stator support 10; the first plate 141 and the second plate 142 are provided with mounting grooves 144 extending in the axial direction respectively, and the heat exchanger 30 is detachably mounted on the fixing support 14 through the mounting grooves 144 of the first plate 141 and the second plate 142.

As shown in FIG. 6, in some embodiments, the mounting grooves 144 are respectively arranged at sides of the first plate 141 and the second plate 142 facing to each other, and the heat exchanger 30 is inserted into the mounting grooves 144 of the first plate 141 and the second plate 142. At this time, the accommodating chamber 101 is formed by the ring-shaped plate 13, the stator support 10, the fixing support 14 and the main shaft 1 together; the accommodating chamber 101 forms the effective airflow organization sealing chamber in the electric motor, so that the phenomenon of the airflow short circuit can be avoided when the cooling air entering the accommodating chamber 101 through the second ventilation hole b performs the heat exchange with the heat exchanger 30.

In addition, when two or more accommodating chambers 101 are arranged at the stator support 10 in its own circumferential direction, two or more fixing support 14 are distributed to be spaced apart from one another in the circumferential direction of the stator support 10, and an isolation chamber 103 is formed between each two adjacent accommodating chambers 101 by the fixing support 14; in other words, on an inner side of the ring-shaped plate 15 in the radial direction, the isolation chamber 103 and the accommodating chamber 101 are alternately arranged at the stator support 10 in the circumferential direction.

Because the flow-confluence chamber 102 communicates with the airflow organization of the heat exchanger 30 in each accommodating chamber 101 by means of the second ventilation hole b formed in the circumferential direction of the ring-shaped plate 13, and the isolation chamber 103 communicates with the ventilation chambers 21 at the two ends of the electric motor in the axial direction through the first ventilation holes a on the first separating plate 11 and the second separating plate 12, each isolation chamber 103 communicates with the airflow organization of each heat exchanger 30. After any circulating fan 40 fails, other circulating fans 40 can still pass airflow through the heat exchanger 30 corresponding to the failed circulating fan 40, so that the heat dissipation requirements of the stator winding set 1a, the stator iron cores 1b and the magnetic steel 2a corresponding to the failed circulating fan 40 can be taken into consideration at the same time, and the reliability and the fault tolerance of the electric motor can be improved.

As shown in FIG. 7, in some embodiments, the mounting grooves 144 are respectively arranged on sides of the first plate 141 and the second plate 142 facing away from each other, and the heat exchanger 30 is inserted into the mounting groove 144 of the first plate 141 of the fixing support 14 and the mounting groove 144 of the second plate 142 of another adjacent fixing support 14. At this time, the accommodating chamber 101 is formed by the ring-shaped plate 13, the stator support 10, the first plate 141 of the fixing support 14, the second plate 142 of another adjacent fixing support 14 and the main shaft 1 together; the accommodating chamber 101 forms the effective airflow organization sealing chamber in the electric motor, so that the phenomenon of the airflow short circuit can be avoided when the cooling air entering the accommodating chamber 101 through the second ventilation hole b performs the heat exchange with the heat exchanger 30.

Further referring to FIG. 5, an inspection opening 111 allowing the heat exchanger 30 to pass through is formed on the first separating plate 11, and the first separating plate 11 is sealingly covered at the inspection opening 111 by a cover plate 15. For example, a sealing ring or the like is arranged between the cover plate 15 and the inspection opening 111.

A first joint 31 and a second joint 32 are arranged on the heat exchanger 30; a first opening 151 and a second opening 152 are formed on the cover plate 15; the first joint 31 extends out of the first opening 151 and is connected to the liquid supplying pipe 50; the second joint 32 extends out of the second opening 152 and is connected to the liquid returning pipe/air returning pipe 60.

Therefore, on one hand, the fixing support 14 can be used as a reinforcing rib of the stator support 10, which can improve the structural strength and the rigidity of the stator support 10; on the other hand, the heat exchanger 30 is detachably inserted into the mounting grooves 144, and the corresponding inspection opening 111 is formed on the first separating plate 11; when replacing or repairing the heat exchanger 30, it is only necessary to disassemble the cover plate 15 and pull the heat exchanger 30 in the axial direction to quickly complete the replacement work from the inspection opening 111, so that the replacement efficiency can be improved.

Since the circulating fan 40 is arranged at the side of the stator support 10 in the axial direction, when the circulating fan 40 needs to be replaced, the circulating fan 40 can be directly removed from the air supplying pipe 43 without disassembling other components, so that the maintainability of the electric motor can be improved.

It should be noted that, although the cooling system has been described above to take the electric motor having the structure of the outer rotor and the inner stator as an example for the convenience of description, it should be understood that, according to the exemplary embodiments of the present disclosure, the working principle of the cooling system as described above can also be applied to the electric motor having the structure of outer stator and inner rotor, and the corresponding stator support 10 and rotor support 20 can be adapted to be modified.

In addition, a wind-power electric generator set is further provided by the embodiments of the present disclosure, including a nacelle 300, and the electric motor as described above, in which the circulating fan 40 of the cooling system of the electric motor is arranged on a side of the nacelle 300, so that it is convenient for mounting, maintenance and replacement in later.

The wind-power electric generator set provided by the embodiments of the present disclosure adopts the electric motor as described above, so that it can effectively reduce the size of the nacelle 300, thereby reducing the cost of the overall machine and the load of the overall machine, and improving the reliability and the maintainability of the wind-power electric generator set.

In addition, the electric motor according to the exemplary embodiment described above can be applied to various devices that need to be provided with the electric motor, such as but not limited to the wind-power electric generator set.

Those skilled in the art should understand that the above-mentioned embodiments are all illustrative and not limited. Different technical features appearing in different embodiments can be combined to achieve beneficial effects. Those skilled in the art should be able to understand and implement other modified embodiments of the disclosed embodiments on the basis of studying the drawings, description, and claims. In the claims, the term "comprising" does not exclude other means or steps; when an article is not modified with a quantitative word, it is intended to include one/kind or multiple/kind of articles, and can be used interchangeably with "one/kind or multiple/kind of articles; the terms "first" and "second" are used to denote names rather than to indicate any specific order. Any reference signs in the claims should not be construed as limiting the scope of protection. The functions of multiple parts appearing in the claims can be implemented by a single hardware or software module. The appearance of certain technical features in different dependent claims does not mean that these technical features cannot be combined to achieve beneficial effects.

What is claimed is:

1. A cooling system, applied to an electric motor, wherein the electric motor comprises a stator support and a rotor support, the stator support is dynamically sealingly connected to the rotor support to form ventilation chambers, the ventilation chambers are respectively arranged at two ends of the electric motor in an axial direction, first ventilation holes are formed at two ends of the stator support in the axial direction respectively, and the cooling system comprises
   a flow-confluence chamber, arranged in a circumferential direction of the stator support;
   an accommodating chamber, arranged in the circumferential direction of the stator support; wherein the accommodating chamber is located at an inner side of the flow-confluence chamber in a radial direction and communicates with the flow-confluence chamber, and the first ventilation holes are located outside the accommodating chamber;
   a heat exchanger, arranged in the accommodating chamber or in the flow-confluence chamber;
   a circulating fan, arranged in the circumferential direction of the stator support and located at a side of the stator support in the axial direction, wherein the circulating fan has an air inlet and an air outlet;
   wherein after cooling air flows out of the air outlet of the circulating fan, a part of the cooling air enters one end of the ventilation chamber which is closer; the other part of the cooling air enters the other end of the ventilation chamber through the first ventilation holes, which are respectively formed at the two ends of the stator support in the axial direction, the two part of the cooling air flow over a heat-generating member in the electric motor, and then enters the air inlet of the circulating fan via the flow-confluence chamber, the heat exchanger and the accommodating chamber; and
   two or more circulating fans are distributed to be spaced apart from one another in the circumferential direction of the stator support; two or more accommodating chambers are distributed to be spaced apart from one another in the circumferential direction of the stator support, and correspond to the two or more circulating fans in a one-to-one correspondence, and the heat exchanger is arranged in each of the accommodating chambers.

2. The cooling system according to claim 1, wherein the stator support comprises a ring-shaped plate extending in the axial direction; the stator support comprises the flow-confluence chamber and the accommodating chamber in the radial direction, and the flow-confluence chamber is connected with the accommodating chamber by the ring-shaped plate; the ring-shaped plate is provided with at least one second ventilation hole in the circumferential direction; and the flow-confluence chamber communicates with the accommodating chamber through the second ventilation hole.

3. The cooling system according to claim 2, wherein the stator support further comprises a first end plate and a second end plate that extend in the radial direction and are arranged opposite to each other in the axial direction, and the flow-confluence chamber extending through in the circumferential direction is formed by the first end plate, the second end plate and the ring-shaped plate.

4. The cooling system according to claim 3, wherein the stator support further comprises a first separating plate and a second separating plate that are located between the first end plate and the second end plate, extend in the radial direction, and are arranged coaxially; the first separating plate and the second separating plate are respectively located on an inner side of the first end plate in the radial direction and an inner side of the second end plate in the radial direction, and the accommodating chamber is formed by the first separating plate, the second separating plate and the ring-shaped plate.

5. The cooling system according to claim 4, wherein the first ventilation holes are arranged at the first separating plate and the second separating plate, and/or the heat exchanger is arranged in the accommodating chamber, and the circulating fan is arranged on an outer side of the first separating plate in the axial direction.

6. The cooling system according to claim 4, wherein the cooling system further comprises at least one fixing support distributed to be spaced apart from one another in the circumferential direction of the stator support, the fixing support is arranged between the first separating plate and the second separating plate, and the heat exchanger is detachably mounted on the fixing support.

7. The cooling system according to claim 6, wherein the fixing support comprises a first plate and a second plate that extend in the radial direction of the stator support and are arranged opposite to each other in the circumferential direction of the stator support, and a third plate connecting the first plate and the second plate and extending in the circumferential direction of the stator support; the first plate and the second plate are provided with mounting grooves extending in the axial direction respectively, and the heat exchanger is detachably mounted on the fixing support through the mounting grooves of the first plate and the second plate.

8. The cooling system according to claim 7, wherein the mounting grooves are respectively arranged at sides of the first plate and the second plate facing to each other, and the heat exchanger is inserted into the mounting grooves of the first plate and the second plate.

9. The cooling system according to claim 7, wherein the mounting grooves are respectively arranged at sides of the first plate and the second plate facing away from each other, the heat exchanger is inserted into the mounting groove of the first plate of the fixing support, and the heat exchanger (30) is further inserted into the mounting groove of the second plate of another adjacent fixing support.

10. The cooling system according to claim 6, wherein the cooling system comprises two or more accommodating chambers, an isolation chamber is formed by the fixing support between each two adjacent accommodating chambers, and the isolation chamber communicates with the first ventilation holes.

11. The electric motor, comprising the cooling system according to claim 6.

12. The electric motor, comprising the cooling system according to claim 5.

13. The cooling system according to claim 4, wherein filter members are respectively arranged at the first ventilation holes on the first separating plate and the second separating plate.

14. The cooling system according to claim 4, wherein an inspection opening allowing the heat exchanger to pass through is formed on the first separating plate, and the first separating plate is sealingly covered at the inspection opening by a cover plate.

15. The electric motor, comprising the cooling system according to claim 14.

16. The electric motor, comprising the cooling system according to claim 4.

17. The electric motor, comprising the cooling system according to claim 3.

18. The electric motor, comprising the cooling system according to claim 2.

19. The electric motor, comprising the cooling system according to claim 1.

20. A wind-power electric generator set, comprising
a nacelle, and
the electric motor according to claim 19, wherein the circulating fan of the cooling system of the electric motor is arranged at a side of the nacelle.

\* \* \* \* \*